United States Patent [19]

van Wijngaarden

[11] 4,160,902

[45] Jul. 10, 1979

[54] OPTICAL READING HEAD

[75] Inventor: Hans van Wijngaarden, Leidschendam, Netherlands

[73] Assignee: De Staat der Nederlanden, te Dezen Vertegenwoordigd Door de Directeur-Generaal der Posterijen, Telegrafie en Telefonie, The Hague, Netherlands

[21] Appl. No.: 860,627

[22] Filed: Dec. 14, 1977

[30] Foreign Application Priority Data

Dec. 23, 1976 [NL] Netherlands .......................... 7614338

[51] Int. Cl.² ............................................ G01N 21/38
[52] U.S. Cl. .................................. 250/461 R; 235/462
[58] Field of Search ................... 250/458, 459, 461 R, 250/568; 235/462

[56] References Cited

U.S. PATENT DOCUMENTS 3,662,181    5/1972    Hercher et al. .................. 250/461 R

*Primary Examiner*—Alfred E. Smith
*Assistant Examiner*—Janice A. Howell
*Attorney, Agent, or Firm*—Hugh Adam Kirk

[57] ABSTRACT

Optical reading head, particularly for reading luminescent code bars on documents and the like, which reading head is provided with a source of light for irradiating the bars, with a detector including a hollow optical guide means for collecting the rays emitted by the bars, said guide means being made of a filter material transmitting ultraviolet radiation at least at the end of said guide near the point where the rays are collected.

3 Claims, 2 Drawing Figures

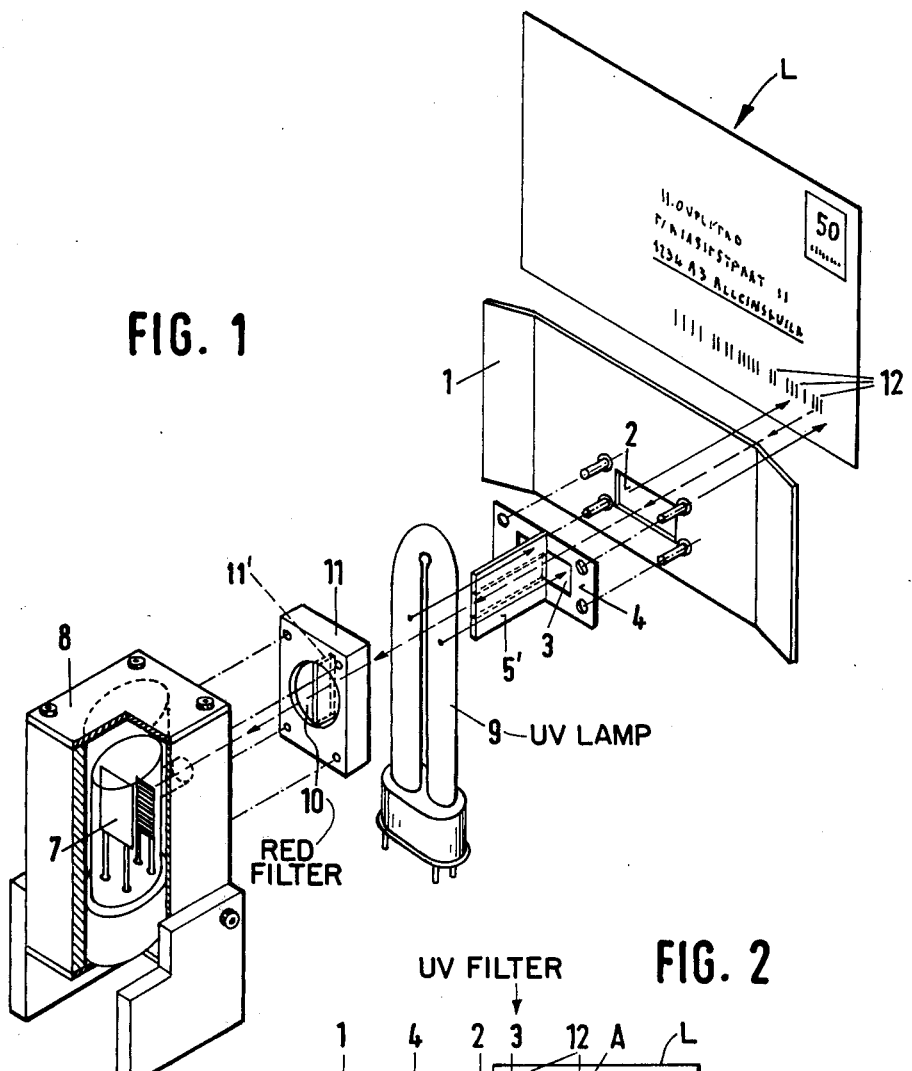
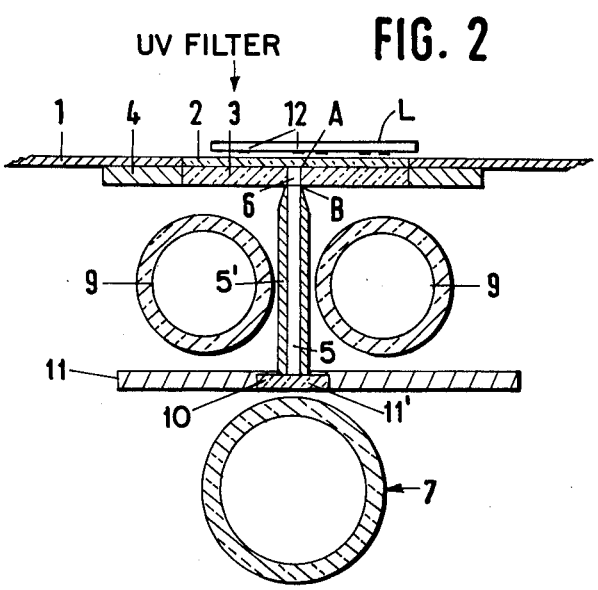

OPTICAL READING HEAD

CROSS-REFERENCES TO RELATED APPLICATIONS

This application is based for priority upon co-pending Netherlands patent application No. 7614338, filed Dec. 23, 1976.

BACKGROUND OF THE INVENTION

1. Field of the Invention

The present invention relates to an optical reading head, particularly for reading luminescent code bars on documents and the like, which reading head is provided with a source of light for irradiating the bars and with a detector for collecting the rays emitted by the bars by means of an optical guide.

For a correct conversion of the code bars into electric signals it is essential that the bars are very sharply and distinctly observed by a light-sensitive detector. For this purpose it is desirable that the optical guide extends to the surface of the document, so that the small area of one code bar on the document can be observed with the least possible losses. This cannot be realized, because the irradiation of the area in question will then no longer be possible. For the sake of an even irradiation of the area the optical guide has to be positioned too far from the document, in consequence of which the area observed is enlarged and the quality of detection diminishes.

2. Description of Prior Art

In a known reading head the optical guide is formed by an optical fibre, and a separate optical fibre is utilized for transmitting light from the source of light to the code bars. This arrangement meets the difficulty of a source of light and a detector that are in each other's way, and thus, if no special measures are taken, they both have to be positioned as near as possible to the code bar to be read.

The solution according to the known reading head has the drawback that it requires a very intensive source of visible radiation, which develops much heat and, as a consequence, has to be cooled, and which has a short life, which increases the risk of operating trouble. Moreover, the ends of the optical guides always hinder one another near the document.

SUMMARY OF THE INVENTION

The present invention provides a better solution, because of the fact that the optical guide is hollow and that at least the end near the point where the rays are collected by the optical guide, the guide is made of a filter material transmitting ultraviolet radiation to the bars to be detected on the document. Thus it is possible to extend the tubular optical guide almost to the document. The walls of the optical guide permit the ultraviolet radiation of the source of different wavelength light generated by irradiating the bars to pass, but they stop the light that is sent back to be detected. In this case a low-power source of ultraviolet radiation, which consequently needs no cooling and which has a long life, can now be positioned very near to the point where the code bars to be read pass.

It is usual to irradiate a code bar from two angles, to wit from both sides of the optical guide for the light sent back from the bars to be detected. When utilizing two separate sources of ultraviolet radiation it is difficult to avoid interference. According to a preferred embodiment, the source of radiation comprises a U-shaped low-pressure mercury vapour lamp, and a flat tube optical guide placed between the legs of the lamp. This arrangement provides a solution for the problem of interference and ensures a very adequate construction.

BRIEF DESCRIPTION OF THE DRAWINGS

The above mentioned and other features, objects and advantages, and a manner of attaining them are described more specifically below by reference to an embodiment of this invention shown in the accompanying drawings, wherein:

FIG. 1 is an exploded perspective view of a preferred embodiment of the present invention, including a coded letter being read; and FIG. 2 is an enlarged horizontal cross-section assembly of most of the parts shown in FIG. 1.

DESCRIPTION OF A PREFERRED EMBODIMENT

The reading head consists of a bipartite housing, which can be dismounted by means of a sliding movement. The part fixed to the machine, e.g. a postal sorting machine, contains—apart from a top plate, side walls and the like—a letter L guiding plate 1, provided with a quartz-glass window 2 serving for the protection against dust. An ultraviolet filter 3 in a frame 4 as well as a hollow optical guide 5, mainly having the shape of a flat tube 5', are placed against the the window 2. The aperture 6 (See FIG. 2) in the filter 3 is the beginning of the optical guide 5. The sliding part of the reading head contains, apart from a drawer-shaped mounting plate and a backwall, a light-sensitive detector 7 placed in a housing or tube 8, a U-shaped ultraviolet lamp 9 and a red filter 10 mounted in a filter frame 11. The entrance-opening of the filter frame 11 is such that the optical guide 5 exactly fits into a slot or seat 11' in the frame 11. When the reading head is assembled, the optical guide 5 joins the filter frame 11, and passes between the legs of the lamp 9.

The detection of the code bars 12 is effected due to the luminescent constituents of the ink which is used. The area on the letter L around the aperture 6 is irradiated by ultraviolet rays with a wavelength of 3650 A. As the lamp 9 also produces visible radiation, the filter 3, which permits the unhindered transmission of ultraviolet radiation and stops all the visible components, has been provided between the lamp 9 and the letter L. Under the influence of the irradiation, the fluorescent code bars 12 emit red light with a wavelenght of about 6000 Å. The wavelength of this light depends on the luminescent ink that is used for the bars 12. In case the code bars 12 are printed on an envelope that luminesces itself too (such as) in a blue colour with a wavelength of 4400 Å caused by a whitener in the paper the red filter 10 (6000 Å) separates the red bars 12 from their blue background. The detector 7 mainly observes the intensity of the red bars 12. The width of the area on the envelope or letter L that can be seen by the detector 7, is about equal to the width of a code bar 12, i.e. about 0.6 mm. The space between the bars is about 1 mm, so that they can be well distinguished. This narrow area on the letter L can be observed with little loss of light thanks to the fact that in principle the aperture 6 forms part of the optical guide 5. Thus the light sent back through the optical guide 5 begins in area A (see FIG. 2), whereas this light begins in area B to be ultraviolet radiation before it reaches area A. In this way only the light emitted by the code bar which is before the 0.5 mm wide opening 6 of the optical guide, can reach the detector 7.

The optical guide 5 could have been made entirely of a material transmitting ultraviolet radiation, but this is not necessary. In fact in FIG. 2, the flat tube 5', has even been made so long that the aperture 6 of the filter 3 suffices as part of a material transmitting ultraviolet radiation, and the adjacent end of the flat tube 5' of the remaining part of the optical guide 5 have been bevelled to the area B.

The construction in the way as described above results in a compact, robust, and very suitable reading head. The power of the source of radiation needs to be only 6 W (watts), so that a completely closed and, consequently, dust-proof housing can be utilized.

While there is described above the principles of this invention in connection with specific apparatus, it is to be clearly understood that this description is made only by way of example and not as a limitation to the scope of this invention.

What we claim is:

1. Optical reading head, particularly for reading luminescent code bars on documents and the like, which reading head comprises: a source of light for irradiating the bars, a detector for collecting the rays emitted by the bars, a filter material transmitting ultraviolet radiation at least adjacent the documents, and a hollow tubular optical guide for the filtered rays to said detector.

2. Optical reading head according to claim 1, wherein the source of radiation comprises a U-shaped low-pressure mercury vapour lamp, and said optical guide comprises a flat tube placed between the legs of said lamp.

3. Optical reading head according to claim 1 wherein said head includes a second optical filter adjacent said detector for transmitting the radiation transmitted through said guide.

* * * * *

UNITED STATES PATENT AND TRADEMARK OFFICE
CERTIFICATE OF CORRECTION

PATENT NO. : 4,160,902
DATED : July 10, 1979
INVENTOR(S) : Hans van Wijngaarden

It is certified that error appears in the above-identified patent and that said Letters Patent are hereby corrected as shown below:

Column 1, line 57, after "of" insert - - light to pass, but they stop the - -; lines 58 and 59, cancel "to pass, but they stop the light". Column 2, line 44, change "A" to - - $\overset{\circ}{A}$ - - ; line 54, change ")" to - - , - - ; line 55, after "paper" insert - - ) - - . Column 3, line 2, after "guide" insert - - 5 - - .

Signed and Sealed this

Sixth Day of November 1979

[SEAL]

Attest:

RUTH C. MASON
Attesting Officer

LUTRELLE F. PARKER
Acting Commissioner of Patents and Trademarks